United States Patent [19]

Sakairi et al.

[11] Patent Number: 5,669,718
[45] Date of Patent: Sep. 23, 1997

[54] STEERING COLUMN BEARING

[75] Inventors: Yoshikazu Sakairi; Atsushi Ueno, both of Fujisawa, Japan

[73] Assignee: Oiles Corporation, Tokyo, Japan

[21] Appl. No.: 578,064

[22] Filed: Dec. 20, 1995

[30] Foreign Application Priority Data

Dec. 28, 1994 [JP] Japan .................. 6-340611

[51] Int. Cl.[6] .............. F16C 27/06; F16C 33/02; B62D 1/16
[52] U.S. Cl. .............. 384/220; 384/215; 384/296; 384/275; 74/492
[58] Field of Search .................. 384/275, 279, 384/284, 282, 273, 222, 215, 220, 295, 296, 416, 418, 428; 74/492

[56] References Cited

U.S. PATENT DOCUMENTS

| | | | |
|---|---|---|---|
| 1,941,768 | 1/1934 | Vigne | 384/282 |
| 2,159,545 | 5/1939 | Bartosch . | |
| 2,855,249 | 10/1958 | Gérard | 384/279 |
| 3,018,146 | 1/1962 | Euwe et al. . | |
| 3,431,033 | 3/1969 | Dangauthier . | |
| 3,515,445 | 6/1970 | Stone . | |
| 3,936,101 | 2/1976 | McDonald | 384/222 |
| 4,303,094 | 12/1981 | Rothwell et al. | 384/222 |
| 4,410,285 | 10/1983 | Strasser et al. | 384/279 |
| 5,120,091 | 6/1992 | Nakagawa | 384/279 |
| 5,129,738 | 7/1992 | Nakagawa | 384/279 |
| 5,267,797 | 12/1993 | Brandt | 384/275 |
| 5,385,422 | 1/1995 | Kruger | 384/275 |
| 5,462,365 | 10/1995 | Brandt | 384/275 |

FOREIGN PATENT DOCUMENTS

| | | | |
|---|---|---|---|
| 2657564 | 8/1991 | France | 384/222 |
| 0221018 | 12/1983 | Japan | 384/275 |
| 6-8817 | 2/1994 | Japan . | |
| 0238017 | 9/1945 | Switzerland | 384/284 |
| 0504017 | 2/1976 | U.S.S.R. | 384/284 |

Primary Examiner—Daniel P. Stodola
Assistant Examiner—Matthew A. Kaness
Attorney, Agent, or Firm—Nixon & Vanderhye

[57] ABSTRACT

A steering column bearing is comprised of an outer bush and an inner bush held in the outer bush. The outer bush includes: an inner ring having a lip portion and a retaining protrusion formed projectingly along the circumferential direction at a predetermined interval from the lip portion in an axial direction; an outer ring having protrusions; a support leg by which an outer peripheral surface portion of the inner ring not corresponding to a hollow cylindrical recess and an inner peripheral surface portion of the outer ring corresponding to that outer peripheral surface portion are integrally connected to each other in the circumferential direction; and reinforcing ribs each of which extends from an outer peripheral surface portion of the inner ring corresponding to the lip portion to the support leg, and integrally connects the outer peripheral surface of the inner ring, the inner peripheral surface of the outer ring, and the support leg.

6 Claims, 3 Drawing Sheets

STEERING COLUMN BEARING

The present invention relates to a steering column bearing for supporting a steering column shaft in a motor vehicle.

Conventionally, a ball bearing or a slide bearing formed of a synthetic resin is used as a steering column bearing for supporting a steering column shaft in a motor vehicle. In general, with respect to the bearing for supporting the steering column shaft in a motor vehicle, the load and rotating conditions concerning the speed and the like are not so stringent, but the stability in friction torque and the vibration absorption characteristic for absorbing vibrations acting on the column shaft during idling and the like are required. As for the ball bearing, its friction torque is stable, but its vibration absorbing characteristic is inferior. In addition, since it is necessary to finish with high dimensional accuracy the housing to which the ball bearing is fixed, as well as the column shaft supported by the ball bearing, there are drawbacks in that the bearing itself is expensive, and that the processing cost also becomes high.

As compared to the aforementioned ball bearing, the slide bearing formed of a synthetic resin has advantages in that it is inexpensive in cost, and that it excels in the vibration absorbing characteristic. However, since an appropriate bearing clearance is required between the slide bearing and the column shaft, there is a drawback in that colliding sound occurs between the column shaft and the bearing due to the vibration occurring in the shaft, and is imparted as uncomfortable noise to the driver of the vehicle. If the clearance is reduced to suppress the occurrence of the colliding sound, the phenomenon of stick slip occurs, thereby giving rise to the problem of hampering the stability of the friction torque.

In view of the above-described problems, a bearing device for a steering column has been proposed in Japanese Utility Model Application Laid-Open No. 8817/1994 (hereafter referred to as the prior art technique), wherein, during the steering (rotating) of the steering wheel, the load acting on the column shaft can be supported smoothly by the beating, while in a state in which no load is applied to the column shaft during such as idling, the vibrations acting on the shaft can be absorbed.

With the bearing device for a steering column in accordance with this prior art technique, the drawbacks of the above-described conventional art are overcome, and, during the steering (rotating) of the steering wheel, the load acting on the column shaft can be supported smoothly by the bearing, while in a state in which no load is applied to the column shaft during such as idling, the vibrations acting on the shaft can be absorbed. However, in a case where the bearing is firmly pressure-fitted into the housing for the purposes of preventing the bearing from coming off axially and rotating in the circumferential direction, the bearing is pressure-fitted into the housing at the outer peripheral surface of its outer ring. However, since the outer ring and the inner ring are connected to each other by means of the plurality of support legs extending in their axial direction, the pressure-fitting force differs at outer peripheral surface portions corresponding to the support leg portions and at outer peripheral surface portions not corresponding to the support leg portions. Hence, the pressure-fitting force does not act uniformly on the inner bush held by the enlarged-diameter hollow cylindrical portion of the inner ring supporting the column shaft. As a result, there is a problem in that an adverse effect is exerted on the dimensional accuracy of the inside diameter (roundness) of the inner bush.

In addition, in a case where a member (bracket) for fixing the housing onto the vehicle body side is attached to the outer peripheral surface of the housing by welding, there is a problem in that a welding strain due to the welding exerts an adverse effect on the dimensional accuracy of the inside diameter (roundness) of the housing, thereby further deteriorating the dimensional accuracy of the inside diameter (roundness) of the inner bush of the bearing fixed in the housing. If these problems are compounded, the dimensional accuracy of the inside diameter (roundness) of the inner bush of the bearing is further aggravated. The quality of the dimensional accuracy of the inside diameter (roundness) of the inner bush of the bearing affects smooth sliding between the inner bush and the column shaft supported by the inner bush. The deterioration of these members hampers the smooth sliding, and is a problem which should be avoided as practically as possible.

SUMMARY OF THE INVENTION

The present invention has been devised to overcome the above-described problems while making use of the advantages of the above-described prior art technique, and it is an object of the present invention to provide a steering column bearing which does not affect the dimensional accuracy of the inside diameter (roundness) of the inner bush, as well as a bearing device using the bearing.

In accordance with the present invention, the above object is attained by a bearing for a steering column comprising: a resilient outer bush and an inner bush, wherein the outer bush includes: an inner ring which has a lip portion arranged in a circumferential direction thereof in a vicinity of one end of a hollow cylindrical inner peripheral surface thereof and projecting radially and a retaining protrusion formed projectingly along the circumferential direction at a predetermined distance from the lip portion in an axial direction thereof so as to define a hollow cylindrical recess in association with the lip portion and the hollow cylindrical inner peripheral surface; an outer ring which has a plurality of protrusions formed on its outer peripheral surface along an axial direction thereof and arranged in a circumferential direction thereof; a support leg by which an outer peripheral surface portion of the inner ring not corresponding to the hollow cylindrical recess and an inner peripheral surface portion of the outer ring corresponding to that outer peripheral surface portion are integrally connected to each other in the circumferential direction; and at least three reinforcing ribs each of which extends axially from an outer peripheral surface portion of the inner ring corresponding to the lip portion to the support leg, and integrally connects an outer peripheral surface portion of the inner ring, an inner peripheral surface portion of the outer ring, and the support leg, and wherein the inner bush is held in the hollow cylindrical recess of the inner ring.

In addition, in accordance with the present invention, the above object is also attained by a bearing device for a steering column wherein the bearing is pressure-fitted in a housing at the protrusions on the outer peripheral surface of the outer ring, and wherein the column shaft is supported in such a manner as to be in sliding contact with the lip portion of the inner ring of the outer bush with an interference range and to maintain a predetermined bearing clearance with an inner peripheral surface of the inner bush.

In the above-described arrangement, the lip portion and the retaining protrusion of the inner ring of the outer bush may be an annular lip portion and an annular retaining protrusion which are respectively formed in such a manner as to extend continuously along the inner circumferential direction of the inner ring, or may be a plurality of lip portions and a plurality of retaining protrusions which are respectively arranged on the inner peripheral surface of the inner ring at intervals along the circumferential direction. In a preferred example, the lip portion is formed such that the diameter of a phantom circle formed by the distal end of the lip portion (i.e., the inside diameter of the lip portion referred to in the present invention) is smaller than the inside diameter of the inner bush by 0.02 mm to 0.20 mm or thereabouts.

As a material of the resilient outer bush, it is possible to cite an elastic rubber material or an elastic synthetic resin. As preferred examples of the elastic synthetic resin, it is possible to cite those which are soft and tough and Generally have a Shore hardness (JIS K 7215, ISO 868, ASTM D 2240) of 40 to 60 and an impact resilience value (JIS K 6301, ISO 1767, ASTM D 2632) of 50 to 80, and in which the behavior of rubber-like resilience remains, such as a polyester-ether copolymer, polyurethane, and the like.

As a preferred example of the inner bush, it is possible to cite a wound bush in which a strip having a three-layered structure comprising a thin steel sheet, a sintered metal layer joined integrally to the surface of this thin steel sheet, and a synthetic resin layer impregnating and coating the sintered metal layer is wound in a hollow cylindrical shape with the synthetic resin layer placed on the inner side thereof.

With the bearing device for a steering column according to the present invention, since the outer peripheral surface portion of the inner ring not corresponding to the hollow cylindrical recess and the inner peripheral surface portion of the outer ring corresponding to that outer peripheral surface portion are integrally connected to each other by the support leg in their circumferential direction, the pressure-fitting force at the time when the bearing is pressure-fitted and fixed in the housing does not directly act on the hollow cylindrical recess of the inner ring. Consequently, the dimensional accuracy of the inside diameter (roundness) of the inner bush held in the hollow cylindrical recess is not affected. In addition, by virtue of the above-described arrangement, even in a case where a welding strain due to welding exerts an adverse effect on the dimensional accuracy of the inside diameter (roundness) of the housing, deviations in the dimensional accuracy of the inside diameter of the housing does not directly affect the hollow cylindrical recess of the inner ring. Hence, the dimensional accuracy of the inside diameter (roundness) of the inner bush held in the hollow cylindrical recess is not affected.

As described above, in accordance with the present invention, since the outer peripheral surface portion of the inner ring not corresponding to the hollow cylindrical recess and the inner peripheral surface portion of the outer ring corresponding to that outer peripheral surface portion are integrally connected to each other by the support leg in their circumferential direction, the pressure-fitting force at the time when the bearing is pressure-fitted and fixed in the housing does not directly act on the hollow cylindrical recess of the inner ring. Hence, the dimensional accuracy of the inside diameter (roundness) of the inner bush inserted and held in the hollow cylindrical recess is not affected. Therefore, it is possible to provide a bearing device for a steering column in which an appropriate clearance (sliding clearance) is maintained between the inner bush and the column shaft supported by the inner bush, so that smooth sliding is effected.

Hereafter, a detailed description will be given of the present invention with reference to the drawings, and the above and other objects and features of the present invention will become more apparent therefrom. It should be noted that the present invention is not limited to the following preferred embodiment.

DESCRIPTION OF THE PREFERRED EMBODIMENT

Figure 5:
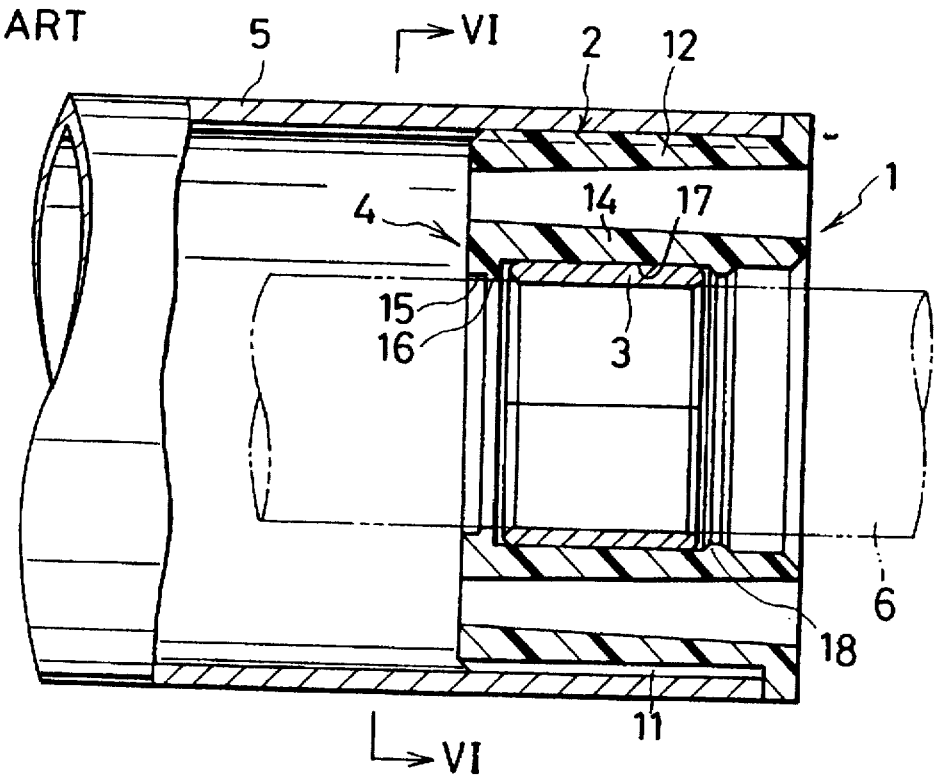
FIG. 5 is a cross-sectional view illustrating a prior art technique.
Figure 6:
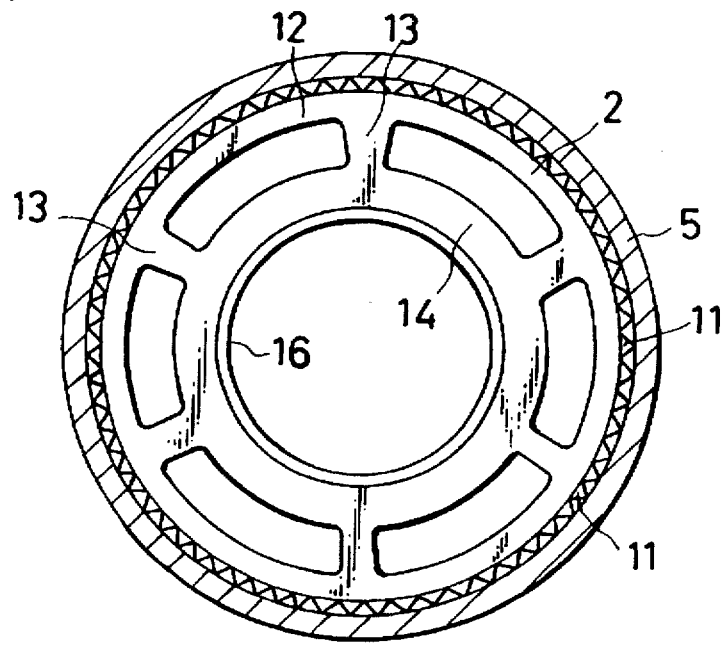
FIG. 6 is a cross-sectional view taken along a line VI—VI in FIG. 5.

First, a description will be given of the prior art technique with respect to the present invention with reference to FIGS. 5 and 6. In FIGS. 5 and 6, a bearing device 1 for a steering column is comprised of: a bearing 4 including an outer bush 2 consisting of an elastic rubber material or an elastic synthetic resin and an inner bush 3 inserted to an inner surface of the outer bush 2; a housing 5 for pressure-fitting and fixing the bearing 4 therein; and a column shaft 6 supported by the bearing 4. The outer bush 2 includes an outer ring 12 having on its outer peripheral surface a plurality of protrusions 11 formed along the axial direction of the bush and over the entire circumference thereof, and an inner ring 14 which is integrally connected to the inner surface of the outer ring 12 by means of a plurality of supporting legs 13 extending in the axial direction. The inner ring 14 includes an annular lip portion 16 formed in the circumferential direction at one end of its inner surface 15 in such a manner as to project radially inwardly with a slightly smaller inside diameter than the inside diameter of the inner bush 3, an enlarged-diameter hollow cylindrical portion 17 continuing from the lip portion 16, and a retaining protrusion 18 formed over part or the whole of the circumference of the enlarged-diameter hollow cylindrical portion 17 spaced apart from the lip portion 16 with a predetermined distance in the axial direction and having an inside diameter larger than the inside diameter of the inner bush 3 and smaller than the outside diameter thereof. The inner bush 3 is inserted and held in the enlarged-diameter hollow cylindrical portion 17 between the annular lip portion 16 and the retaining protrusion 18 on the inner surface of the inner ring 14 of the outer bush 2. The outer bush 2 holding the inner bush 3 is pressure-fitted and fixed in the housing 5 at the protrusions 11 on the outer peripheral surface of its outer ring 12. The column shaft 6 is supported in such a manner as to be brought into sliding contact with the annular lip portion 16 on the inner surface of the inner ring 14 of the outer bush 2 with an interference range, while maintaining a predetermined bearing clearance with the inner peripheral surface of the inner bush 3.

With the above-described bearing device 1 for a steering column in accordance with this prior art technique, the drawbacks of the above-described conventional art are overcome, and, during the steering (rotating) of the steering wheel, the load acting on the column shaft 6 can be supported smoothly by the bearing 4, while in a state in which no load is applied to the column shaft 6 during such as idling, the vibrations acting on the shaft 6 can be absorbed. However, in a case where the bearing 4 is firmly pressure-fitted into the housing 5 for the purposes of preventing the bearing 4 from coming off axially and rotating in the circumferential direction, the bearing 4 is pressure-fitted into the housing 5 at the outer peripheral surface of its outer ring 12. However, since the outer ring 12 and the inner ring 14 are connected to each other by means of the plurality of support legs 13 extending in their axial direction, the pressure-fitting force differs at outer peripheral surface portions corresponding to the support leg 13 and at outer peripheral surface portions not corresponding to the support leg 13. Hence, the pressure-fitting force does not act uniformly on the inner bush 3 held by the enlarged-diameter hollow cylindrical portion 17 of the inner ring 14 supporting the column shaft 6. As a result, there is a problem in that an adverse effect is exerted on the dimensional accuracy of the inside diameter (roundness) of the inner bush 3.

In addition, in a case where a member (bracket) for fixing the housing 5 onto the vehicle body side is attached to the outer peripheral surface of the housing 5 by welding, there is a problem in that a welding strain due to the welding exerts an adverse effect on the dimensional accuracy of the inside diameter (roundness) of the housing 5, thereby further deteriorating the dimensional accuracy of the inside diameter (roundness) of the inner bush 3 of the bearing 4 fixed in the housing 5. If these problems are compounded, the dimensional accuracy of the inside diameter (roundness) of the inner bush 3 of the bearing 4 is further aggravated. The quality of the dimensional accuracy of the inside diameter (roundness) of the inner bush 3 of the bearing 4 affects smooth sliding between the inner bush 3 and the column shaft 6 supported by the inner bush 3. The deterioration of these members hampers the smooth sliding, and is a problem which should be avoided as practically as possible.

The present invention has been devised to overcome the above-described problems while making use of the advantages of the above-described prior art technique.

As shown in FIGS. 1 to 4, a bearing device 20 for a steering column in accordance with a preferred embodiment of the present invention is comprised of: a bearing 23 including an outer bush 21 formed of an elastic rubber material or an elastic synthetic resin and an inner bush 22 inserted and held in the outer bush 21; a pipe-shaped housing 24 in which the bearing 23 is pressure-fitted and fixed; and a column shaft 25 supported by the inner bush 22.

The outer bush 21 includes: an inner ring 35 which has a plurality of (in this example, six) lip portions 32 arranged in the circumferential direction in the vicinity of one end of a hollow cylindrical inner peripheral surface 31 and projecting radially inwardly, and a plurality of (in this example, six) retaining protrusions 34 formed projectingly along the circumferential direction at a predetermined distance from the lip portions 32 in the axial direction so as to define a hollow cylindrical recess 33 in association with the lip portions 32 and the hollow cylindrical inner peripheral surface 31; an outer ring 38 which has a plurality of protrusions 36 formed on its outer peripheral surface along the axial direction and arranged in the circumferential direction, and an annular collar portion 37 extending radially outwardly at one end thereof; a support leg 39 by which an outer peripheral surface portion of the inner ring 35 not corresponding to the hollow cylindrical recess 33 and an inner peripheral surface portion of the outer ring 38 corresponding to that outer peripheral surface portion are integrally connected to each other in the circumferential direction; and three reinforcing ribs 40 which extend from an outer peripheral surface portion of the inner ring 35 corresponding to the lip portions 32 to the support leg 39, and is integrally connected to an outer peripheral surface portion of the inner ring 35, an inner peripheral surface portion of the outer ring 38, and the support leg 39.

In the outer bush 21, the annular collar portion 37 formed integrally with one end of the outer ring 38 is required when the bearing 23 is secured to an end of the housing 24 at the time of the pressure-fitting and fixing of the bearing 23 in the housing 24 which will be described later. The annular collar portion 37 is not required when the bearing 23 is pressure-fitted and fixed at an arbitrary position within the housing 24.

The reinforcing ribs 40 reinforce the inner ring 35 at the portion where the hollow cylindrical recess 33 is formed, and in this example three reinforcing ribs 40 are formed at equal intervals in the circumferential direction such that they do not correspond to each other in the radial direction. The number of the reinforcing ribs 40 is not necessarily be limited to three insofar as they can be disposed at equal intervals in the circumferential direction such that they do not correspond to each other in the radial direction. The reason for disposing the reinforcing ribs 40 at equal intervals in the circumferential direction such that they do not correspond to each other in the radial direction is to ensure that the inside dimension of the inner bush 22, which will be described later and is inserted and held in the hollow cylindrical recess 33, will not be affected by the pressure-fitting force occurring when the bearing 23 is pressure-fitted and fixed in the housing 24.

Figure 1:
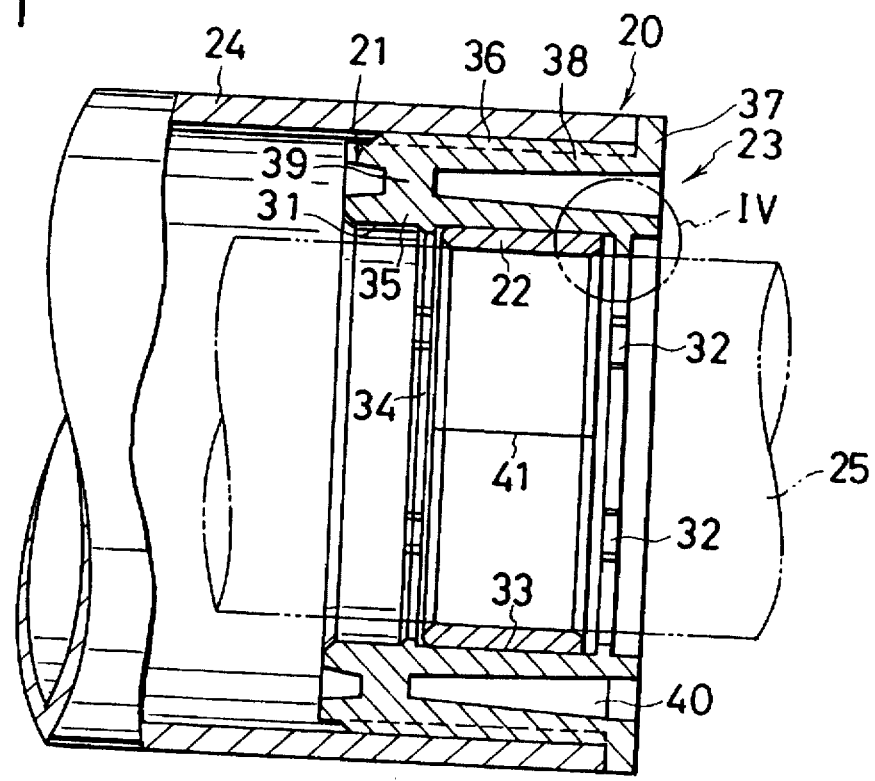
FIG. 1 is a cross-sectional view of a preferred embodiment of the present invention.
Figure 2:
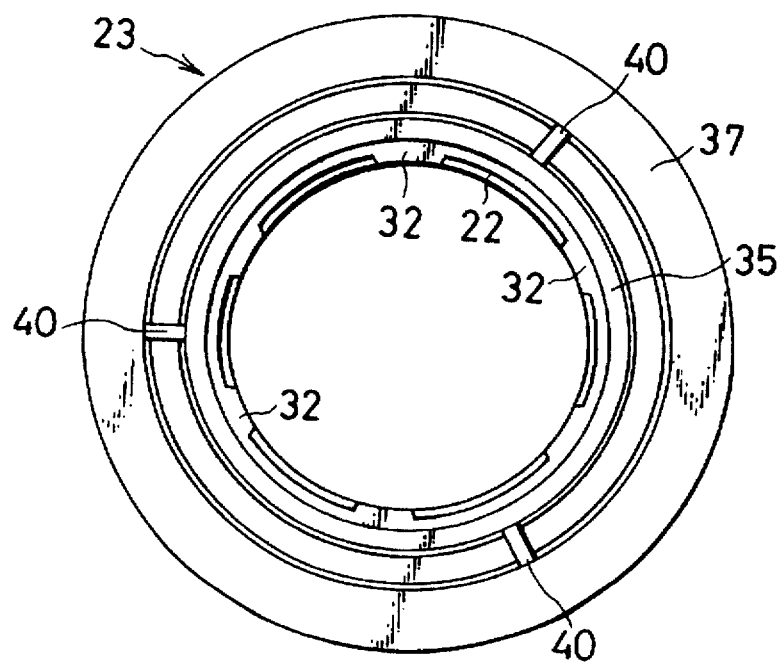
FIG. 2 is a right-hand side elevational view of the embodiment shown in FIG. 1.
Figure 3:
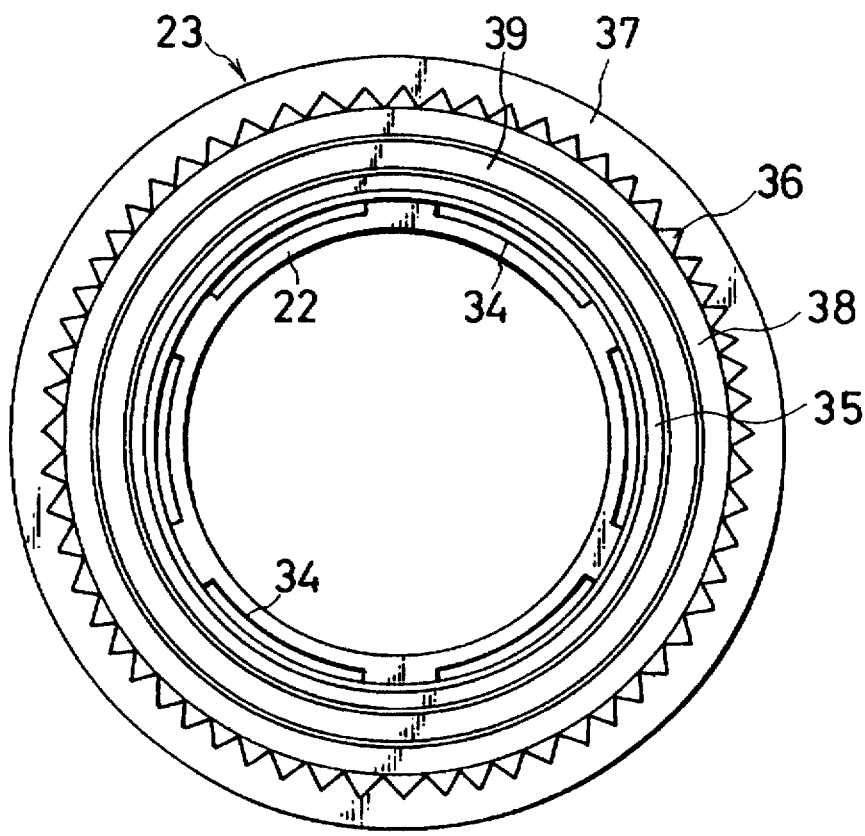
FIG. 3 is a left-hand side elevational view of the embodiment shown in FIG. 1.
Figure 4:
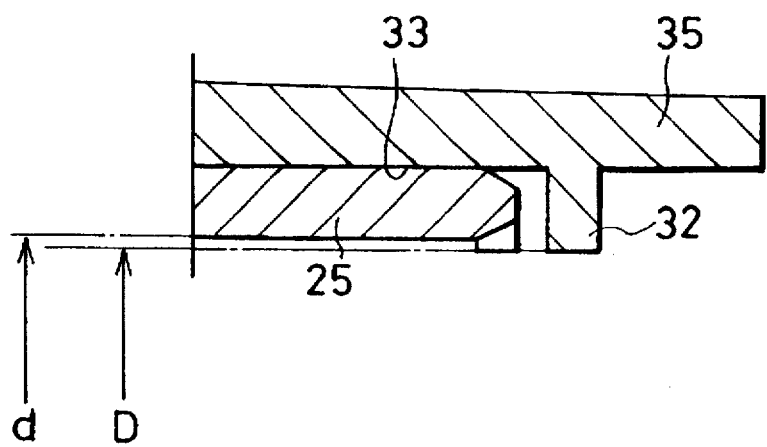
FIG. 4 is an enlarged cross-sectional view of a IV portion shown in FIG. 1.

The inner bush 22 is constituted by a so-called wound bush in which a strip having a three-layered structure comprising a thin steel sheet, a sintered metal layer joined integrally to the surface of this thin steel sheet, and a synthetic resin layer impregnating and coating the sintered metal layer is wound in a hollow cylindrical shape with the synthetic resin layer placed on the inner side. In FIG. 1, reference numeral 41 denotes a butted portion of the wound bush.

The bearing 23 is formed as the inner bush 22 is inserted and held in the hollow cylindrical recess 33 of the inner ring 35 of the outer bush 21. In this arrangement, the plurality of lip portions 32 formed on the hollow cylindrical inner peripheral surface 31 of the inner ring 35 is formed in such a manner as to project radially inwardly with an inside diameter D (which refers to the diameter of a phantom circle formed by the distal ends of the lip portions 32) slightly smaller than the inside diameter d of the inner bush 22. Specifically, the lip portions 32 are formed such that the inside diameter of the lip portions 32 is smaller than the inside diameter of the inner bush 22 by an amount corresponding to the clearance (sliding clearance) between the inner bush 22 and the column shaft supported by the inner bush 22, e.g., by 0.02 mm to 0.20 mm. In addition, the retaining protrusions 34 are so formed that the inside diameter of the protrusions 34 is larger than the inside diameter of the inner bush 22 and smaller than the outside diameter of the bush 22. Accordingly, the inner bush 22 is prevented from coming off the inner ring 35 as the inner bush 22 is inserted and held in the hollow cylindrical recess 33 of the inner ring 35.

With the bearing device 20 for a steering column formed as described above, since the outer peripheral surface portion of the inner ring 35 not corresponding to the hollow cylindrical recess 33 and the inner peripheral surface portion of the outer ring 38 corresponding to that outer peripheral surface portion are integrally connected to each other by the support leg 39 in their circumferential direction, the pressure-fitting force at the time when the bearing 23 is pressure-fitted and fixed in the housing 24 does not directly act on the hollow cylindrical recess 33 of the inner ring 35. Consequently, the dimensional accuracy of the inside diameter (roundness) of the inner bush 22 inserted and held in the hollow cylindrical recess 33 is not affected. Therefore, an appropriate clearance (sliding clearance) is maintained between the inner bush 22 and the column shaft 25 supported by the inner bush 22, so that smooth sliding is effected without causing malfunctioning such as uneven abutment.

In addition, the effect of the pressure-fitting force is exerted on not only the dimensional accuracy of the inside diameter of the inner bush 22 but also the lip portions 32 of the inner ring 35. Further, since the interference range of the lip portions 32 with respect to the column shaft 25 is not affected by the pressure-fitting force, the column shaft 25 is slidably and resiliently supported on and by the lip portions 32 with a predetermined interference range. Accordingly, in the state in which the load does not act on the column shaft 25 during such as idling, the column shaft 25 is resiliently supported by the lip portions 32. Hence, vibrations acting on the column shaft 25 are absorbed, the generation of colliding sound between the column shaft 25 and the inner bush 22 is prevented, and the load acting on the column shaft 25 during the steering of the steering wheel is smoothly supported by the inner bush 22 with the above-described appropriate clearance (sliding clearance).

What is claimed is:

1. A bearing for a steering column comprising:

a resilient outer bush and an inner bush, wherein said outer bush includes:

an inner ring which has a lip portion projecting inwardly radially in a vicinity of one end of an inner peripheral surface thereof and a retaining protrusion projecting inwardly radially on said inner peripheral surface at a predetermined distance from said lip portion in an axial direction thereof so as to define a hollow cylindrical recess in association with said lip portion and said inner peripheral surface;

an outer ring which has a plurality of protrusions formed on its outer peripheral surface along an axial direction thereof and arranged in a circumferential direction thereof;

an annular support leg which is united at an annular inner surface thereof with a first outer peripheral surface portion of said inner ring not corresponding to said hollow cylindrical recess, and which is united at an annular outer surface thereof with an inner peripheral surface portion of said outer ring facing said first outer peripheral surface portion; and at least three reinforcing ribs, each of which extends axially from a second outer peripheral surface portion of said inner ring corresponding to said lip portion to said support leg through a third outer peripheral surface portion of said inner ring corresponding to said hollow cylindrical recess, each said rib being united with said second and third outer peripheral surface portions of said inner ring, other inner peripheral surface portion of said outer ring, and said support leg, at inner and outer longitudinal ends and lateral one end thereof respectively, said other inner peripheral surface portion of the outer ring facing said second and third outer peripheral surface portions of the inner ring; and wherein said inner bush is held in said hollow cylindrical recess of said inner ring.

2. A bearing for a steering column according to claim 1, wherein said lip portion of said inner ring of said outer bush is so formed that an inside diameter of said lip portion of said inner ring is slightly smaller than an inside diameter of said inner bush.

3. A bearing for a steering column according to claim 1 or 2, wherein said inner bush is constituted by a wound bush in which a strip having a three-layered structure comprising a thin steel sheet, a sintered metal layer formed integrally on a surface of the thin steel sheet, and a synthetic resin layer impregnating and coating the sintered metal layer is wound in a hollow cylindrical shape with the synthetic resin layer placed on an inner side thereof.

4. A bearing device for a steering column comprising: a bearing including a resilient outer bush and an inner bush, wherein said outer bush includes:

an inner ring which has a lip portion projecting inwardly radially in a vicinity of one end of an inner peripheral surface thereof and a retaining protrusion projecting inwardly radially on said inner peripheral surface at a predetermined distance from said lip portion in an axial direction thereof so as to define a hollow cylindrical recess in association with said lip portion and said inner peripheral surface;

an outer ring which has a plurality of protrusions formed on its outer peripheral surface along an axial direction thereof and arranged in a circumferential direction thereof;

an annular support leg which is united at an annular inner surface thereof with a first outer peripheral surface portion of said inner ring not corresponding to said hollow cylindrical recess, and which is united at an annular outer surface thereof with an inner peripheral surface portion of said outer ring facing said first outer peripheral surface portion; and at least three reinforcing ribs, each of which extends axially from a second outer peripheral surface portion of said inner ring corresponding to said lip portion, to said support leg through a third outer peripheral surface portion of said inner ring corresponding to said hollow cylindrical recess, each said rib being united with said second and third outer peripheral surface portions of said inner ring, other inner peripheral surface portion of said outer ring, and said support leg, at inner and outer longitudinal ends and lateral one end thereof, respectively, said other inner peripheral surface portion of the outer ring facing to the second and third outer peripheral surface portions of the inner ring; and wherein said inner bush is held in said hollow cylindrical recess of said inner ring, wherein said bearing is pressure-fitted in a housing at said protrusions on the outer peripheral surface of said outer ring, and wherein a column shaft is supported in such a manner as to be in sliding contact with said lip portion of said inner ring of said outer bush with an interference range and to maintain a predetermined bearing clearance with an inner peripheral surface of said inner bush.

5. A bearing device for a steering column according to claim 4, wherein said lip portion of said inner ring of said outer bush is so formed that an inside diameter of said lip portion of said inner ring is slightly smaller than an inside diameter of said inner bush.

6. A bearing device for a steering column according to claim 5; wherein said inner bush is constituted by a wound bush in which a strip having a three-layered structure comprising a thin steel sheet, a sintered metal layer formed integrally on a surface of the thin steel sheet, and a synthetic resin layer impregnating and coating the sintered metal layer is wound in a hollow cylindrical shape with the synthetic resin layer placed on an inner side thereof.

* * * * *